United States Patent
Singh et al.

(10) Patent No.: US 10,339,038 B1
(45) Date of Patent: Jul. 2, 2019

(54) METHOD AND SYSTEM FOR GENERATING PRODUCTION DATA PATTERN DRIVEN TEST DATA

(71) Applicant: JPMorgan Chase Bank, N.A., New York, NY (US)

(72) Inventors: Jagmohan Singh, Coppell, TX (US); Priya Ranjan, Kendall Park, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 103 days.

(21) Appl. No.: 15/718,457

(22) Filed: Sep. 28, 2017

(51) Int. Cl.
*G06F 9/44* (2018.01)
*G06F 11/36* (2006.01)

(52) U.S. Cl.
CPC ...... *G06F 11/3684* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 2011/0225217 A1* | 9/2011 | Plax | G06F 11/3664 707/825 |
| 2016/0063209 A1* | 3/2016 | Malaviya | G16H 50/50 706/12 |

* cited by examiner

*Primary Examiner* — Qamrun Nahar
(74) *Attorney, Agent, or Firm* — Hunton Andrews Kurth LLP

(57) ABSTRACT

The invention relates to implementing a test data tool that generates test data based on production data patterns. According to an embodiment of the present invention, the test data tool comprises: a processor configured to: receive, via the data input, production data from the one or more production environments, the production data comprises personally identifiable information; identify a plurality of attributes from the production data; for each attribute, identify one or more data patterns; generate one or more rules that define the one or more data patterns for each attribute; generate a configuration file based on the one or more rules; apply the configuration file to generate test data in a manner that obscures personally identifiable information existing in the production data; and transmit the test data to a UAT environment.

20 Claims, 4 Drawing Sheets

US 10,339,038 B1

METHOD AND SYSTEM FOR GENERATING PRODUCTION DATA PATTERN DRIVEN TEST DATA

FIELD OF THE INVENTION

The present invention generally relates to test data generation based on production data patterns while protecting sensitive personally identifiable information and other sensitive data that exists in the production environment.

BACKGROUND OF THE INVENTION

For testing extract, transform and load (ETL) processes or benchmarking new products like Structured Query Language (SQL) engines and ETL tools, availability of simulated high volume data is critical for thorough functional and performance testing. SQL engines need to be tested under various test conditions involving high volume data that is representative of a production query work load.

In many cases, production data contains sensitive data, namely personally identifiable information (PII). This data generally represents information that can be used to identify a customer. PII data may include name, phone number, address, email address, phone number, social security number, account information, etc. Because of security risks, entities are required to protect PII data. For example, PII data is only available to individuals with access and on a limited basis, e.g., need to know. Developers tasked with data analytics in big data environments are generally not part of the group with access to customer PII data.

Most current tools provide functionality to mask sensitive data with blanks or pre-defined pattern (e.g., XXXXXX) before copying into lower test environments. However, masking of sensitive data results in non-testable scenarios because masked data attributes cannot be tested in lower environments. In addition, by masking data attributes, meaningful relationships between data entities are lost and therefore cannot be tested.

Accordingly, the masked production data is oftentimes unusable for testing purposes. Data availability of quality and high volume test data has been a real challenge facing most development teams. This slows down development and quality assurance processes.

Because of the lack of high volume quality test data, developers are unable to perform stress testing in a pre-production environment. This creates a risk in production environments as performance of new releases are unknown.

These and other drawbacks exist.

SUMMARY OF THE INVENTION

According to one embodiment, the invention relates to a computer implemented system that implements a test data tool that generates test data based on production data patterns. The test data tool comprises: a data input that interfaces with one or more production environments; an output interface that transmits test data to one or more UAT environments; a communication network that receives production data from the one or more production environments and transmits test data to the one or more UAT environments; and a computer server comprising at least one processor, coupled to the data input, the interactive user interface and the communication network, the processor configured to: receive, via the data input, production data from the one or more production environments, the production data may comprise personally identifiable information; identify a plurality of attributes from the production data; for each attribute, identify one or more data patterns; generate one or more rules that define the one or more data patterns for each attribute; generate a configuration file based on the one or more rules; apply the configuration file to generate test data in a manner that obscures personally identifiable information existing in the production data; and transmit the test data to a UAT or pre-production environment.

The system may include a specially programmed computer system comprising one or more computer processors, mobile devices, electronic storage devices, and networks.

The invention also relates to computer implemented method that implements a test data tool that generates test data based on production data patterns. The method comprises the steps of: receiving, via a data input, production data from one or more production environments, the production data may comprise personally identifiable information; identifying, via computer server, a plurality of attributes from the production data; for each attribute, identifying one or more data patterns; generating, via a rules engine, one or more rules that define the one or more data patterns for each attribute; generating a configuration file based on the one or more rules; applying the configuration file to generate test data in a manner that obscures personally identifiable information existing in the production data; and transmitting, via a communication network, the test data to a UAT or pre-production environment.

The computer implemented system, method and medium described herein provide unique advantages to entities and developers, specifically developers that work and develop applications that process massive amounts of data from various sources. With current systems, projects have a continuous struggle with test data and current masking processes that are very manual and slow. The innovative system provides high quality test data based on actual production data patterns while protecting sensitive customer information. Other advantages include improvements in efficiency, speed and user experience. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
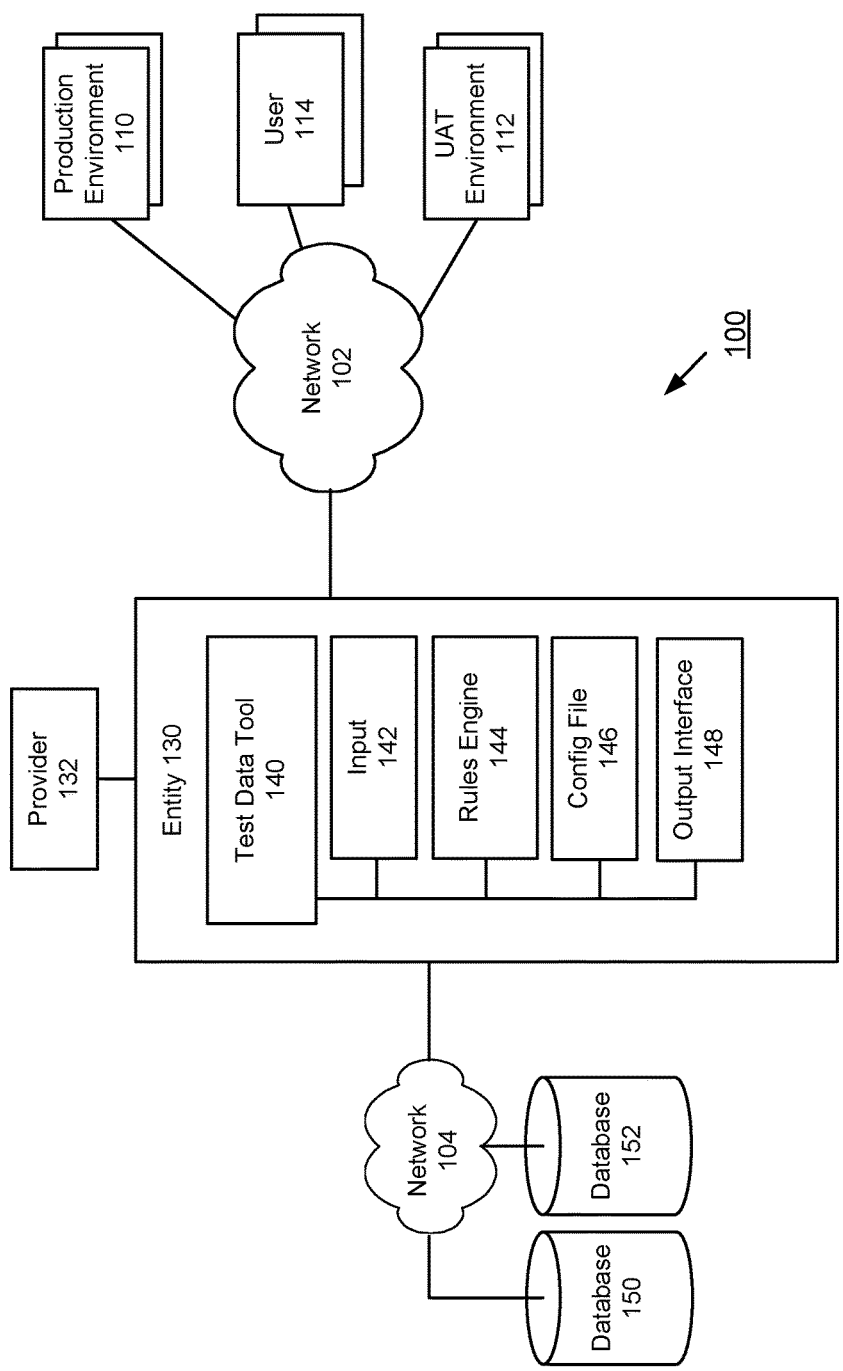
FIG. 1 is an exemplary diagram of a system that implements a test data tool, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to using real data patterns to create synthetic test data. An embodiment of the present invention is directed to generating synthetic data with production test scenarios without exposing sensitive information in lower environments. For example, the system may apply machine learning to identify data patterns based on production data and create corresponding test data files. The data patterns may be identified using several methods. For example, the system may provide data patterns in a separate lookup file (e.g., state code value file). The system may provide data patterns as a data type (e.g., integer, decimal, character string, etc. with precisions and lengths defined). The system may further provide data patterns using regular expressions (e.g., ^[A-Za-z]). An embodiment of the present invention maintains referential integrity across data entities (e.g., test data file). Also, the system may provide a facility to extract this information for a data model which may be defined in data modelling tool and/or defined in a database. An embodiment of the present invention is directed to a process that uses metadata to create a set of test data files that provide synthetic test data with test scenarios contained in real production data. An embodiment of the present invention may be implemented using Python scripts. Other languages may be implemented.

An embodiment of the present invention is directed to masking, tokenizing and applying format preserving encryption to production data for use in lower environment. The innovative system may be fully integrated with Centralized Metadata Hub having PII information on various data sets for PI Certified field (e.g., Golden source). The system may maintain referential integrity and work with metadata systems. They system may apply filters or sub-set the source data. The system can integrate with any tokenization product available.

An embodiment of the present invention is directed to test data generation, at any volume. The system may generate realistic data for any schema and further generate keys while maintaining referential integrity across data sets. For example, valid values, e.g., valid loan types, etc. may be read from a list of supplied list of values. The system may further apply a consistent masking algorithm where the same masked values may be applied across iterations or applications.

An embodiment of the present invention may be directed to test data generation based on sample data through machine learning. For example, when fed a sample production data, the system may profile and define rules for data, e.g., Primary key, Foreign key, valid values, etc. It may then generate any amount of production like data based on the sample production data. For example, from a 1000 row of production data, the system may generate 1 billion rows or more.

The various embodiments of the present invention realizes efficiencies and benefits. With a Cloud ready elastic architecture, the system may scale up and scale down resources on Cloud based on demand. The system may be realized on a parallel and scalable architecture. The system provides firm wide usability and firm standards for Test Data Management. With an open and extensible architecture, the system may use other standard tools and modules.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

FIG. 1 is an exemplary diagram of a system that implements a Test Data Tool, according to an embodiment of the present invention. As illustrated, Network 102 may be communicatively coupled with various users and systems, represented by 110, 112, 114. For example, Test Data Tool 140 may receive production data from Production Environment 110. In addition, Test Data Tool 140 may generate test data for transmission to user acceptance testing (UAT) Environment 112. User 114 may access an interface to review and update configuration files via Output Interface 148. User 114 may communicate with the Test Data Tool 140 via Network 102. For example, Entity 130 may provide data analytics and management and therefore have a need to develop and test applications that process, access and/or analyze massive amounts of data.

Entity 130 may include a Test Data Tool 140 that includes an Input 142, Rules Engine 144, Configuration File 146 and Output Interface 148. The Test Data Tool of an embodiment of the present invention receives production data from various data sources, represented by Production Environment 110, via Input 142. Test Data Tool 140 may analyze the production data and identify data patterns that are captured as rules, via Rules Engine 144. Rules Engine 144 may implement a machine learning algorithm, for example. Test Data Tool 140 may then generate a configuration file, represented by 146. Output Interface 148 enables users to review and modify configuration files prior to test data generation. The configuration files may be displayed on an interactive user interface, such as 148. The configuration files may be displayed in various formats, including custom record formats. In addition, reports and analytics may be applied and further stored in storage components, such as 150, 152, via Network 104.

The Test Data Tool described herein may be provided by Entity 130 and/or a third party provider, represented by 132, where Provider 132 may operate with an Entity 130, for example. Rules and configuration files may be stored and managed in databases, represented by 150, 152 via Network 104.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Network 102, 104 may be a wireless network, a wired network or any combination of wireless network and wired network. For example, Network 102, 104 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 102, 104 may support an Internet network, a wireless communication network, a cellular network, Bluetooth, or the like, or any combination thereof. Network 102, 104 may further include one, or any number of the exemplary types of networks mentioned above operating as a stand-alone network or in cooperation with each other. Network 102, 104 may utilize one or more protocols of one or more network elements to which it is communicatively coupled. Network 102, 104 may translate to or from other protocols to one or more protocols of network devices. Although Network 102, 104 is depicted as one network for simplicity, it should be appreciated that according to one or more embodiments, Network 102, 104 may comprise a plurality of interconnected networks, such as, for example, a service provider network, the Internet, a cellular network, corporate networks, or even home networks, or any of the types of networks mentioned above.

Data may be transmitted and received via Network 102, 104 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Entity 130 may communicate with various entities using any mobile or computing device, such as a laptop computer, a personal digital assistant, a smartphone, a smartwatch, smart glasses, other wearables or other computing devices capable of sending or receiving network signals. Output Interface 148 may represent a user interface and/or other interactive communication portal.

Entity 130 may be communicatively coupled to Databases 150, 152. Databases 150, 152 may include any suitable data structure to maintain the information and allow access and retrieval of the information. For example, Databases 150, 152 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases 150, 152 may be any suitable storage device or devices. The storage may be local, remote, or a combination thereof with respect to Databases 150, 152. Databases 150, 152 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases 150, 152 may have back-up capability built-in. Communications with Databases 150, 152 may be over a network, or communications may involve a direct connection between Databases 150, 152 and Entity 130, as depicted in FIG. 1. Databases 150, 152 may also represent cloud or other network based storage.

Figure 2:
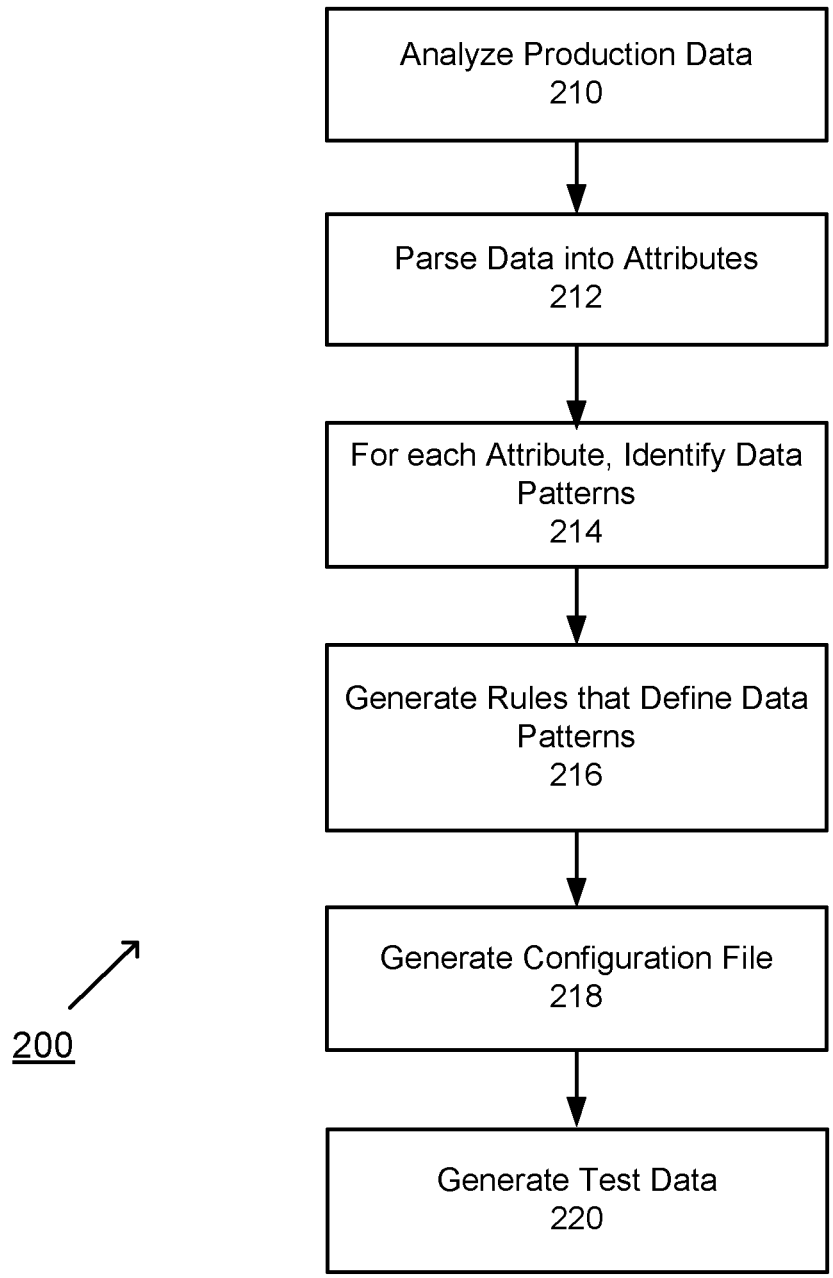
FIG. 2 is an exemplary flowchart illustrating a test data generation process, according to an embodiment of the present invention.

FIG. 2 is an exemplary flowchart illustrating a test data generation process, according to an embodiment of the present invention. At step 210, production data may be analyzed. At step 212, one or more attributes may be identified. At step 214, for each attribute, one or more data patterns may be identified. At step 216, a set of rules may be generated to define the data patterns for each attribute (or group of attributes). At step 218, a configuration file may be generated. At step 220, test data may be generated based on the configuration file. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

At step 210, production data may be analyzed. The system may identify a file, table and/or other data structure in production. The system may determine the size of the file, e.g., number of records, etc. An embodiment of the present invention may analyze the entire production data as well as a portion of the production data. For example, the production data may be filtered, sorted and/or organized. According to another example, a sampling or subset of the data may be analyzed. For example, the analyzed production data may be limited to a predetermined time period. Other criteria and/or conditions may be applied.

At step 212, one or more attributes may be identified. An embodiment of the present invention may parse the production data to identify attributes. Based on the type of application and/or environment, various attributes may be identified. For example, in a banking environment, attributes may include customer identifier, street address, account identifier, account balance, investor code, credit score, etc.

At step 214, for each attribute, one or more data patterns and/or characteristics may be identified. For example, an embodiment of the present invention may identify a first attribute that uniquely identifies a record. In this example, the first attribute may be an identifier. A second attribute may be identified as a text string. In this example, the second attribute may represent a card holder's name. A third attribute may be identified as a value where the possible values are A, B, C, D and E. The third attribute may represent a code. In this example, each code value may represent a different set of rules that are applied where the logic is built into the code value. Accordingly, as shown by this example, if masking were applied, the test data would represent the code as a "X" or other non-meaningful replacement and thereby render this code value untestable. A fourth attribute may be identified as a number string with two decimals. The system may recognize the fourth attribute as a dollar amount. Accordingly, an embodiment of the present invention is directed to protecting sensitive personal information by generating synthetic test data based on data patterns as they exist in the production data.

At step 216, a set of rules may be generated to define the data patterns for each attribute (or group of attributes). For each of the attributes, an embodiment of the present invention may develop rules that characterize the data patterns. For example, an attribute may be identified as a 2 character attribute. This attribute may represent a state abbreviation. For some applications, the state attribute may not be significant to the testing environment. In this case, any random two characters may be generated. However, in other applications, an accurate representation may be important. For example, in foreclosures, the state of residence may have specific implications, requirements and/or other restrictions. In this example, an embodiment may apply a more accurate representation of this particular attribute. Accordingly, the system may generate a rule that applies a two character string that represents a known state code (out of 50 possible two character values). In addition, the system may recognize a percentage of state code breakdown and apply a corresponding percentage of the test data for a better representation of the production data. For example, the system may recognize a production data with 30% residence in California and apply a similar percentage of California residence to the generated test data.

Accordingly, the system may apply varying levels of granularity in terms of similarity and accuracy. This may be applied by determining a measure of importance in replicating similarity to the production data. For example, in a particular application, because cardholder name is not relevant, the system may apply a high level of randomness to a test data text string for the name attribute. In other applications, because state of residence may have a direct impact on the analysis, the system may apply a more accurate representation to the test data.

In analyzing production data, an embodiment of the present invention may address outliers by ignoring the outlier values, applying a majority value and/or considering the number of occurrences and generating a corresponding percentage of occurrences in the test data. In addition, outlier values may be addressed by the importance of the value. When an attribute is a text string that represents a first and last name combination, an occurrence of a number (e.g., II, III, IV, etc.) in the name may be ignored as opposed to a code where the code value is significant in terms of the test application. Other variations may be supported.

Accordingly, the system may generate test data that more accurately replicates production data to run and execute more meaningful tests. With the various embodiments of the present invention, state code attributes may contain actual state code values (instead of XX values) and specific code values may contain actual code values (e.g., code A, B, C, D, E) in a manner that resembles, corresponds to and/or matches the production data.

At step 218, a configuration file may be generated. An embodiment of the present invention may learn data patterns by analyzing the production data and based on the rules that define the data patterns, a configuration file may be generated. The configuration file may identify how many test data records are to be generated. The configuration file may also identify the rules to be used to generate the test data. The rules may define the learned attributes from the production data.

An embodiment of the present invention may present a representation of the configuration file to a user via an interactive interface and provide the user the ability to modify and update the configuration file. For example, a user may modify certain rules as well as apply exclusions. For example, a configuration file may identify 10 values for a particular attribute in production. Because a test may be specific to a subset of the 10 values, the configuration file may be modified to include a subset of 4 values out of the 10 values. According to another example, the configuration file may be updated to apply a general masking (or a random text string) to a street address field. In contrast, the configuration file may preserve a state attribute (e.g., where the state attribute is applied in a more representative manner) when the testing environment involves a test with state specific rules.

According to another example, the system may analyze the test application and/or environment and automatically determine key attributes and/or other conditions to test certain features and/or functions of the test application. Based on the analysis, the system may automatically modify the configuration rules for optimal test data.

According to an embodiment of the present invention, the system may modify the configuration file to generate test data to be applied to various other applications. For example, using the configuration file, an embodiment of the present invention may apply one or more additional filters (e.g., location, type of customer, age bracket, etc.). Also, the configuration file may be merged with one or more other files that may include another configuration file. For example, an embodiment of the present invention may have production data relevant to a specific card product. To generate a wider range of test data, the system may merge the configuration file with another configuration file that is specific to a different line of product (e.g., financial product, etc.). Other variations may be applied.

At step 220, test data may be generated based on the configuration file. Based on the configuration file, an embodiment of the present invention may generate test data that mimics and/or corresponds to the production data. For example, the original production data may include a thousand records. Test data may be generated to include a million records for testing an application and/or environment. The test data may be applied to various functional tests, performance tests, etc. The test data may be replicated many times over for various other applications, testing environments, etc.

According to an embodiment of the present invention, the system maintains relationships between attributes when generating test data. For example, a loan file may contain loan attributes specific to account number, account type and loan balance. The loan file may also include a borrower identifier attribute. In this example, a borrower file may contain a borrower identifier, customer name, customer address, contact information and other borrower attributes. The system recognizes that there is a relationship between a loan file and a borrower file and therefore, the borrower identifier on the loan file must match the borrower identifier on the borrower file. Accordingly, if the identifiers do not match, effective testing is not possible and the relationship is not translated properly. An embodiment of the present invention preserves the match between the two identifiers, without exposing the actual identifier.

Figure 3:
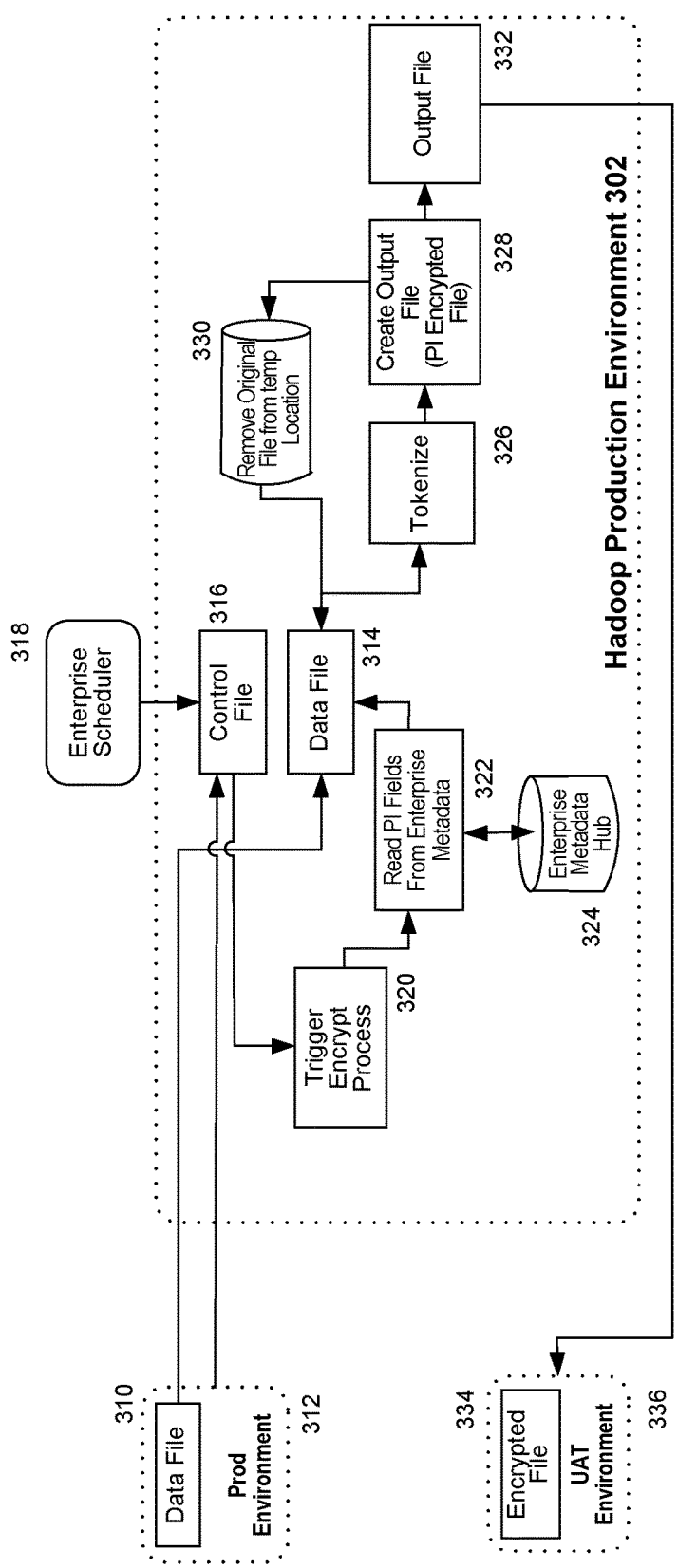
FIG. 3 is an exemplary diagram of a Hadoop Production Environment that implements a test data tool, according to an embodiment of the present invention.

FIG. 3 is an exemplary diagram of a Hadoop Production Environment that implements a Test Data Tool, according to an embodiment of the present invention. As shown in FIG. 3, an embodiment of the present invention is directed to masking, tokenizing and applying format preserving encryption to production data for use in lower environment. FIG. 3 illustrates a fully automated data masking process. Data Files from Control files may be sent to Hadoop Production Edge Node. Data File 310 from Production Environment 312 may be received at Data File 314 and Control File 316, within Hadoop production environment 302. Enterprise Scheduler File watcher 318 may kick off an Encryption Process. An Encryption Process may be triggered at 320. Enterprise Metadata registration information may be read for PI fields, at 322, via Enterprise Metadata Hub at 324. Tokenization process may be applied at 326. An output file may be created at 328. Original files may be removed from a temporary location, at 330. An output encrypted file may be generated at 332 and then sent as an encrypted file 334 to a target environment, represented by 336. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

According to an embodiment of the present invention, a control file format may include SQR, Entity, Delim, File, Output File, Number of rows, filter, etc. Other formats may be applied.

Figure 4:
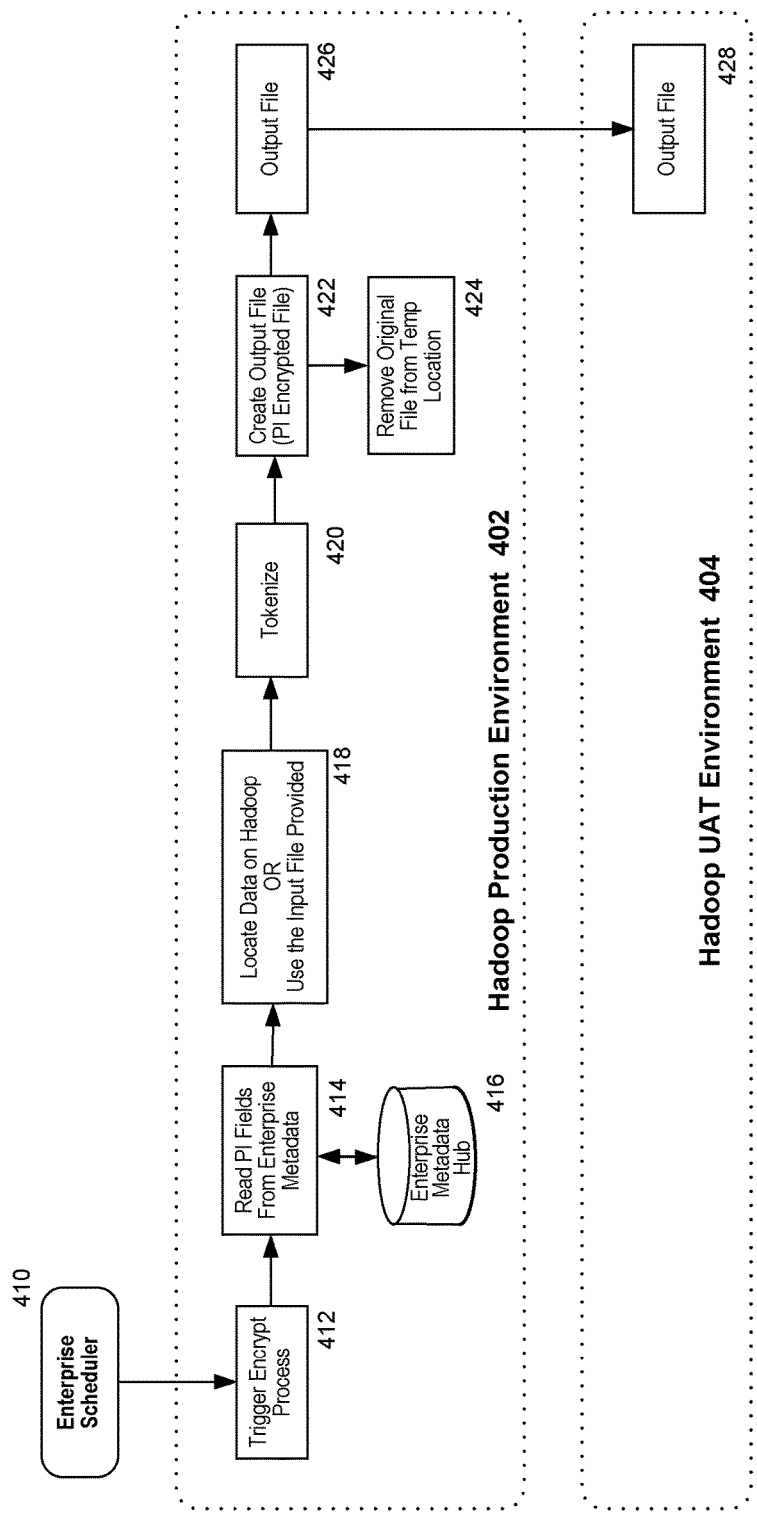
FIG. 4 is an exemplary diagram of a Hadoop Production Environment that implements a test data tool, according to an embodiment of the present invention.

FIG. 4 is an exemplary diagram of a Hadoop Production Environment that implements a test data tool, according to an embodiment of the present invention. FIG. 4 illustrates a fully automated Test Data Management (TDM) data masking and/or Format Preserving Encryption (FPE) process. Production Environment is represented by 402 and user acceptance testing (UAT) environment is represented by 404. UAT represents a last phase of software testing where actual software users may test the software to ensure it can handle tasks in real-world or near real-world scenarios.

At 410, a job may be initiated using Enterprise Scheduler to process the control file. At 412, an encryption process may be triggered. At step 414, PI fields from a Metadata hub registration may be read from Enterprise Metadata Hub 416. At 418, data may be located on Hadoop. Also, an input file may be used. At 420, a tokenization process may be applied. At 422, an output file including an PI encrypted file may be created. At 424, an original file may be removed from a temporary location. At 426, an output file may be generated and then sent to a UAT or pre-production environment as shown by 428. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in various databases and data stores. For example, the database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that implements a test data tool that generates test data based on production data patterns, the test data tool comprising:
   a data input that interfaces with one or more production environments;
   an output interface that transmits test data to one or more user acceptance testing (UAT) environments;
   a communication network that receives production data from the one or more production environments and transmits test data to the one or more UAT environments; and
   a computer server comprising at least one processor, coupled to the data input, the interactive user interface and the communication network, the processor configured to:
   receive, via the data input, production data from the one or more production environments, the production data comprises personally identifiable information;
   identify a plurality of attributes from the production data;
   for each attribute, identify one or more data patterns;
   generate one or more rules that define the one or more data patterns for each attribute;
   generate a configuration file based on the one or more rules;
   apply the configuration file to generate test data in a manner that obscures personally identifiable information existing in the production data; and
   transmit the test data to a UAT environment.

2. The computer implemented system of claim 1, wherein the one or more data patterns comprise data type including integer, decimal and character strings.

3. The computer implemented system of claim 1, wherein the one or more data patterns comprise a representative expression.

4. The computer implemented system of claim 1, wherein a representation of the configuration file is displayed on the interactive user interface to enable a user to update the configuration file.

5. The computer implemented system of claim 1, wherein the configuration file identifies a number of test data records to be generated.

6. The computer implemented system of claim 1, wherein at least one of the plurality of attributes comprise a code value with corresponding logic.

7. The computer implemented system of claim 1, wherein the computer server is implemented in a cloud based architecture.

8. The computer implemented system of claim 1, wherein the computer server applies machine learning to generate the one or more rules.

9. The computer implemented system of claim 1, wherein one or more attributes have a relationship where a first identifier of a first attribute matches a second identifier of a second attribute.

10. The computer implemented system of claim 9, wherein the configuration file preserves the relationship between the first attribute and the second attribute.

11. A computer implemented method that implements a test data tool that generates test data based on production data patterns, the method comprising the steps of:
    receiving, via a data input, production data from one or more production environments, the production data comprises personally identifiable information;
    identifying, via computer server, a plurality of attributes from the production data;
    for each attribute, identifying one or more data patterns;
    generating, via a rules engine, one or more rules that define the one or more data patterns for each attribute;
    generating a configuration file based on the one or more rules;
    applying the configuration file to generate test data in a manner that obscures personally identifiable information existing in the production data; and
    transmitting, via a communication network, the test data to a user acceptance testing (UAT) environment.

12. The computer implemented method of claim 11, wherein the one or more data patterns comprise data type including integer, decimal and character strings.

13. The computer implemented method of claim 11, wherein the one or more data patterns comprise a representative expression.

14. The computer implemented method of claim 11, wherein a representation of the configuration file is displayed on the interactive user interface to enable a user to update the configuration file.

15. The computer implemented method of claim 11, wherein the configuration file identifies a number of test data records to be generated.

16. The computer implemented method of claim 11, wherein at least one of the plurality of attributes comprise a code value with corresponding logic.

17. The computer implemented method of claim 11, wherein the computer server is implemented in a cloud based architecture.

18. The computer implemented method of claim 11, wherein the computer server applies machine learning to generate the one or more rules.

19. The computer implemented method of claim 11, wherein one or more attributes have a relationship where a first identifier of a first attribute matches a second identifier of a second attribute.

20. The computer implemented method of claim 19, wherein the configuration file preserves the relationship between the first attribute and the second attribute.

* * * * *